United States Patent
Chahine et al.

(10) Patent No.: US 11,454,104 B2
(45) Date of Patent: Sep. 27, 2022

(54) SYSTEM AND METHOD FOR DRILLING A WELLBORE USING PATTERN DETECTION

(71) Applicant: National Oilwell Vareo, L.P., Houston, TX (US)

(72) Inventors: Gilbert Chahine, Houston, TX (US); Ruoyu Li, Cypress, TX (US); Clayton Simmons, Houston, TX (US); Lance Staudacher, Houston, TX (US)

(73) Assignee: National Oilwell Varco, L.P., Houston, TX (US)

( * ) Notice: Subject to any disclaimer, the term of this patent is extended or adjusted under 35 U.S.C. 154(b) by 1045 days.

(21) Appl. No.: 16/086,233

(22) PCT Filed: Mar. 15, 2017

(86) PCT No.: PCT/US2017/022523
§ 371 (c)(1),
(2) Date: Sep. 18, 2018

(87) PCT Pub. No.: WO2017/160993
PCT Pub. Date: Sep. 21, 2017

(65) Prior Publication Data
US 2020/0291764 A1    Sep. 17, 2020

Related U.S. Application Data

(60) Provisional application No. 62/310,436, filed on Mar. 18, 2016.

(51) Int. Cl.
*E21B 21/08*    (2006.01)
*E21B 44/06*    (2006.01)
*E21B 47/06*    (2012.01)

(52) U.S. Cl.
CPC .............. *E21B 44/06* (2013.01); *E21B 21/08* (2013.01); *E21B 47/06* (2013.01); *G05B 2219/45129* (2013.01)

(58) Field of Classification Search
CPC .......... E21B 21/08; E21B 44/06; E21B 47/06
See application file for complete search history.

(56) References Cited

U.S. PATENT DOCUMENTS 8,761,912 B1    6/2014   Chapman, Jr. et al.
2007/0272442 A1  11/2007   Pastusek
(Continued)

FOREIGN PATENT DOCUMENTS

WO    2015/148871 A1    10/2015
WO    2016/022069 A2    2/2016

OTHER PUBLICATIONS

Extended European Search Report dated Oct. 14, 2019, for Application No. 17767437.1.
(Continued)

*Primary Examiner* — Matthew R Buck
(74) *Attorney, Agent, or Firm* — Conley Rose, P.C.

(57) ABSTRACT

A method and system for drilling a wellbore. A method for drilling a wellbore includes: generating a library of defined patterns, each of the defined patterns corresponding to an operational behavior of drilling equipment used to drill the wellbore; collecting, during operation of the drilling equipment, measurements from sensors coupled to the drilling equipment; characterizing the measurements as correlating to one of the defined patterns; detecting the one of the defined patterns in the measurements; extracting a feature from the measurements; determining a condition of the drilling equipment by comparing a value of the feature to a threshold derived from the one of the defined patterns; and activating an actuator coupled to the drilling equipment to adjust operation of the drilling equipment based on the condition.

23 Claims, 11 Drawing Sheets

(56) References Cited

U.S. PATENT DOCUMENTS

| | | | |
|---|---|---|---|
| 2012/0197527 A1* | 8/2012 | McKay | E21B 41/0007 |
| | | | 702/6 |
| 2012/0241163 A1* | 9/2012 | Reitsma | E21B 21/106 |
| | | | 166/355 |
| 2013/0054034 A1* | 2/2013 | Ebenezer | E21B 33/06 |
| | | | 700/282 |
| 2013/0298642 A1* | 11/2013 | Gillette, II | H02J 7/00 |
| | | | 73/31.01 |
| 2014/0231075 A1* | 8/2014 | Springett | E21B 33/064 |
| | | | 166/250.01 |
| 2015/0177403 A1* | 6/2015 | Haugen | G01V 1/40 |
| | | | 73/152.47 |
| 2015/0184505 A1* | 7/2015 | Panicker-Shah | E21B 34/16 |
| | | | 702/9 |
| 2015/0377012 A1* | 12/2015 | Liu | G01N 27/83 |
| | | | 702/6 |

OTHER PUBLICATIONS

International Patent Application No. PCT/US2017/0225231International Search Report and Written Opinion dated Jun. 8, 2017 (15 pages).

* cited by examiner

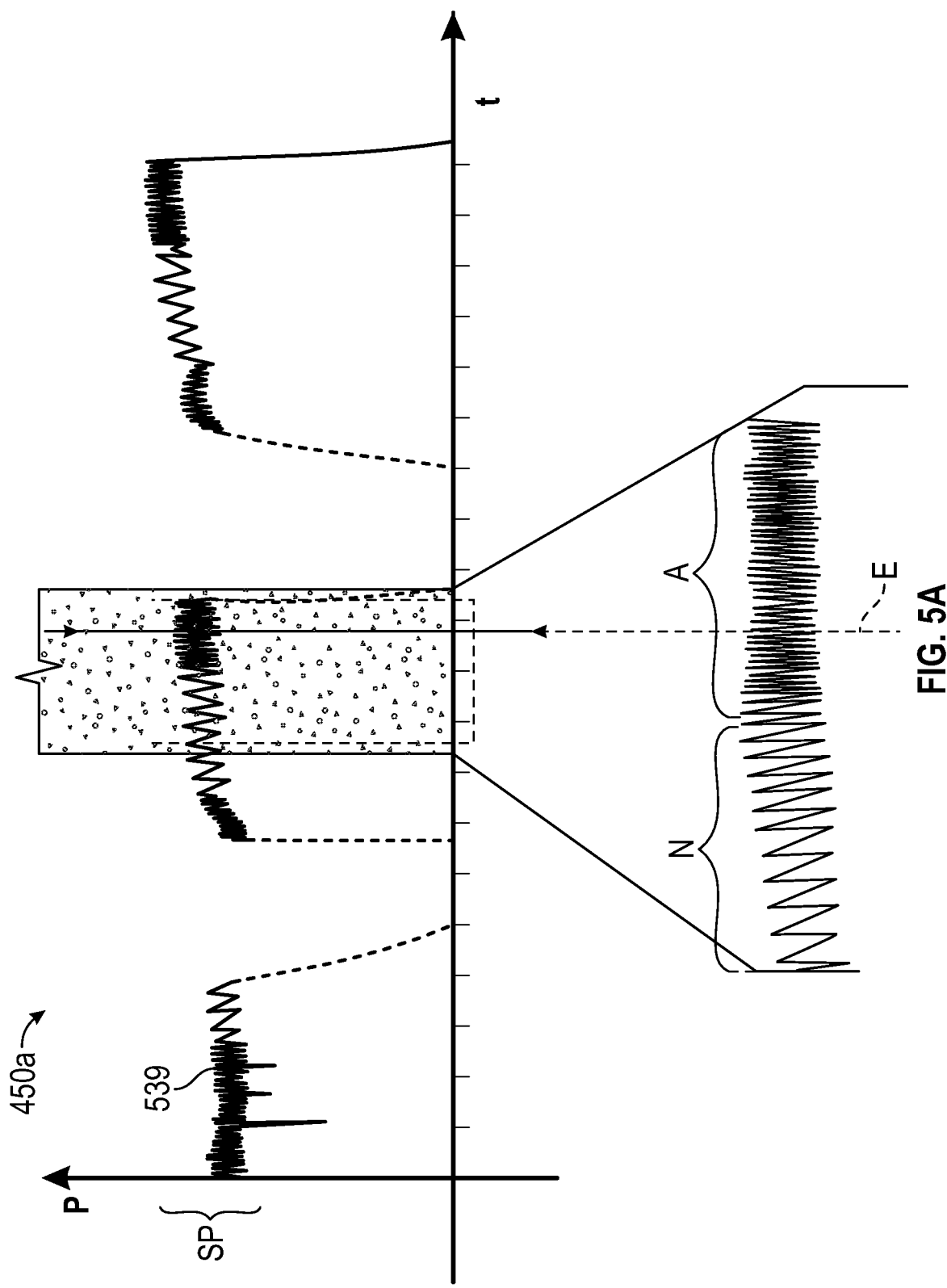

800 ⟶

Method of Pattern Detection for Wellsite Equipment

872 ⟶
[ Sensing equipment signals of wellsite equipment ]

874 ⟶
[ Denoising the measured signal ]

876 ⟶
- Defining patterns for the wellsite equipment when operating according to pre-designed specifications
- Characterizing the equipment signals over time
- Building a library of defined patterns based on at least one of recorded equipment signals, historical data, knowledge input, and combinations thereof 878 ⟶
- Determining irregularities in operation of the wellsite equipment by:
- Characterizing the equipment signals according to the defined patterns
- Detecting the defined patterns in the characterized equipment signals; and
- Classifying the detected defined patterns by extracting features from the detected defined patterns and assigning classifications for the extracted features 880 ⟶
- Providing feedback to the wellsite based on the classifications
- Actuating the wellsite equipment based on the detected irregularities
- Providing a risk index based on the classifications 882 ⟶
[ Validating the defined risk ]

FIG. 8

SYSTEM AND METHOD FOR DRILLING A WELLBORE USING PATTERN DETECTION

CROSS-REFERENCE TO RELATED APPLICATIONS

This application is a National Phase Entry into the U.S. under 35 U.S.C. § 371 of and claims priority to PCT Application No. PCT/US2017/022523, filed Mar. 15, 2017, entitled "System and Method for Drilling a Wellbore Using Pattern Detection," which claims benefit of U.S. provisional patent application Ser. No. 62/310,436, filed Mar. 18, 2016, entitled "Pattern Detection System for Wellsite Equipment and Method of Using Same," the entire contents of each being incorporated by reference herein for all purposes.

BACKGROUND

This present disclosure relates generally to techniques for performing wellsite operations. More specifically, the present disclosure relates to techniques for determining potential irregularities in wellsite equipment, such as blowout preventers.

Oilfield operations may be performed to locate and gather valuable downhole fluids. Oil rigs are positioned at wellsites, and downhole tools, such as drilling tools, are deployed into the ground to reach subsurface reservoirs. Once the downhole tools form a wellbore to reach a desired reservoir, casings may be cemented into place within the wellbore, and the wellbore completed to initiate production of fluids from the reservoir. Downhole tubular devices, such as pipes, certain downhole tools, casings, drill pipe, liner, coiled tubing, production tubing, wireline, slickline, or other tubular members positioned in the wellbore, and associated components, such as drill collars, tool joints, drill bits, logging tools, packers, and the like, (referred to as 'tubulars' or 'tubular strings') may be positioned in the wellbore to enable the passage of subsurface fluids to the surface.

Leakage of subsurface fluids may pose problems if released from the wellbore. Equipment, such as blow out preventers (BOPs), may be positioned about the wellbore to form a seal about a tubular therein to prevent leakage of fluid as it is brought to the surface. BOPs may have selectively actuatable rams or ram bonnets, such as pipe rams or shear rams, that may be activated to seal and/or sever a tubular in a wellbore. Some examples of BOPs for severing tubulars are provided in U.S. Patent/Application Nos. 20110000670; 7,814,979; and 7,367,396. In some cases, it may be necessary to perform maintenance the BOP, for example, when the BOP does not perform as desired or when a part fails on a BOP.

Sensors may be positioned about the wellsite to measure equipment performance. Such measurements are taken to the surface for analysis. Examples of wellsite measurement are provided in Application Nos. WO 2014/130703, the entire contents of which are hereby incorporated by reference herein.

Despite advancements in wellsite measurements there remains a need for determining potential irregularities at the wellsite. The present disclosure is directed at such deficiencies.

BRIEF DESCRIPTION OF THE DRAWINGS

A more particular description of the disclosure, briefly summarized above, may be had by reference to the embodiments thereof that are illustrated in the appended drawings.

It is to be noted, however, that the appended drawings illustrate example embodiments and are, therefore, not to be considered limiting of its scope. The figures are not necessarily to scale and certain features, and certain views of the figures may be shown exaggerated in scale or in schematic in the interest of clarity and conciseness.

FIGS. 5A-5C are schematic diagrams depicting pattern characterization, pattern detection, and pattern classification of the pattern detector.

FIG. 8 is a flow chart depicting methods of pattern detection for wellsite equipment.

DETAILED DESCRIPTION OF THE INVENTION

Figure 1:
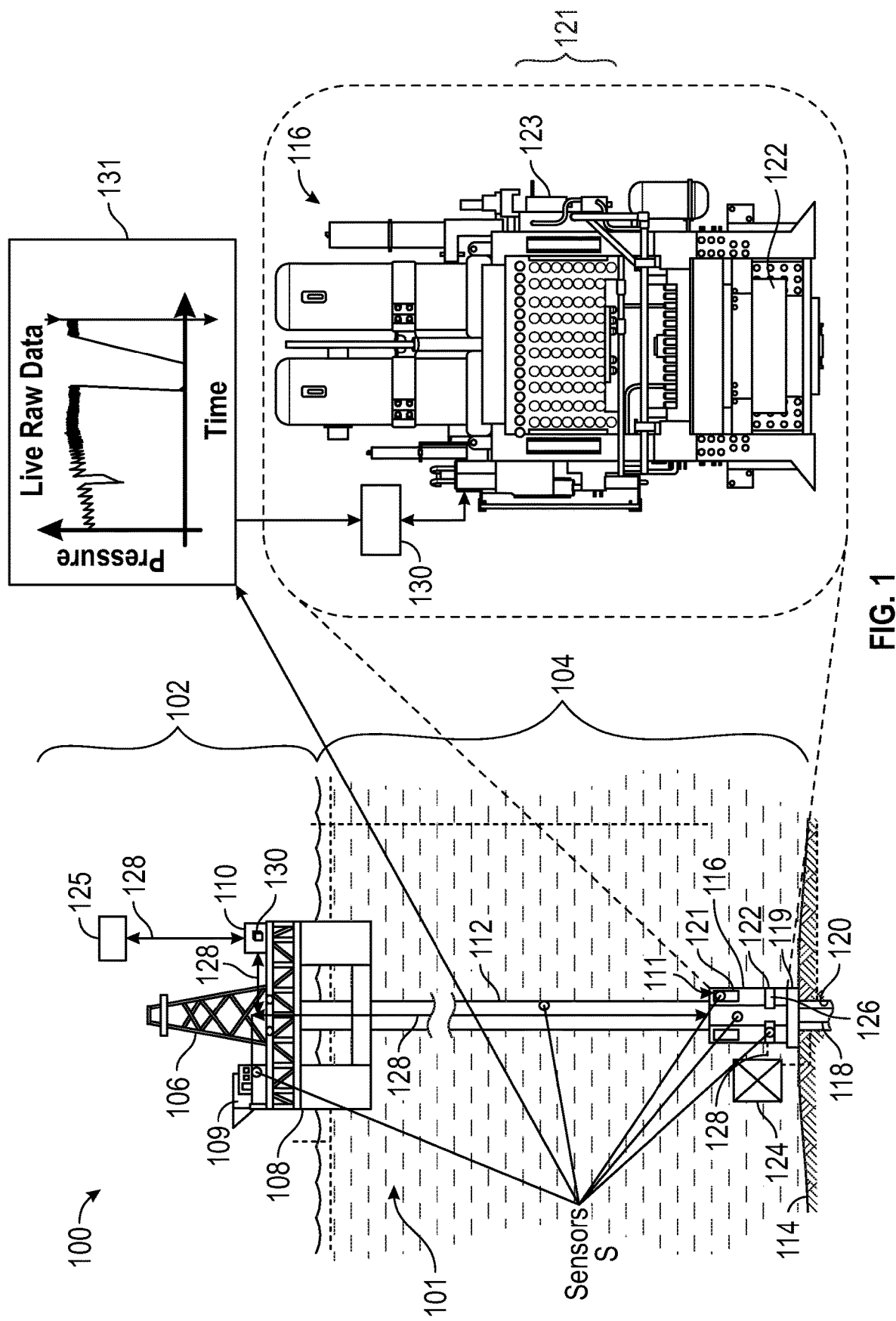
FIG. 1 is a schematic view of an offshore wellsite having subsea equipment including a low marine riser package (LMRP) and a pattern detection system.

The description that follows includes exemplary apparatus, methods, techniques, and/or instruction sequences that embody techniques of the present subject matter. However, it is understood that the described embodiments may be practiced without these specific details.

The disclosure relates to pattern systems and methods for detecting patterns in wellsite equipment. The pattern system includes sensors to sense signals from wellsite equipment and libraries of defined patterns generated over time from the measured signals. Such patterns may be, for example, known pressure readings taken directly for hydraulics of regulators used to operate blowout preventers (BOPs). The library may be used to build trends learned from various sources, such as measured signals, historical data, etc.

The pattern system also includes pattern detectors to create, characterize, detect, and classify equipment signals from the wellsite equipment based on the defined patterns. The pattern detector may be used offline (e.g., in library mode) to contribute to the defined patterns and/or online to monitor equipment signals in situ. The pattern detector may be used to determine irregularities and perform mitigation at the wellsite in response thereto. For example, a change in pressure readings may indicate potential deviations in equipment operation which may lead to failures. Maintenance schedules may be defined predictively (e.g., according to the determined irregularities) and/or preventively (e.g., based on equipment specifications). Other features may also be provided, such as a validation, feedback, and/or actuators to adjust wellsite operations.

The pattern detection system may be used to provide a scalable approach to developing and deploying diagnostics and prognostics capabilities, covering several components, sub-systems, and systems about the wellsite. The pattern detection system may also be used with the goal of providing, for example, one of more of the following: to design operation adjustments (e.g., maintenance of equipment, changes in equipment settings, etc.), provide pattern detection in situ and/or in real-time, provide online and/or offline pattern definition, anticipate failures, predict equipment performance, alert operators of potential issues, gather information about equipment performance, detect potentially faulty behavior, isolate a component or system with a risk for failure, combine redundant checks on equipment to be validated by a second source, predict a horizon to imminent failure, design maintenance schedules, trigger maintenance work-orders for further investigation, strategically define maintenance schedules, leverage opportunistic maintenance, avoid risk associated with unnecessary intrusive maintenance or replacements, establish a framework for collecting and classifying events in order to populate a failure/diagnostics library that can be used for future diagnostics frameworks, infer early signs of failures, provide an appropriate horizon to predict eminent failure, provide condition based maintenance (CBM), optimize equipment performance, reduce downtime, etc. These techniques may be used to provide alerts with appropriate lead time, as well as mitigation recommendations, such as maintenance, equipment adjustments, etc.

FIG. 1 depicts an offshore wellsite 100 with a pattern detection system 101. While an offshore wellsite 100 is depicted, the wellsite may be land based. The wellsite 100 has a surface system 102 and a subsea system 104. The surface system 102 may include a rig 106, a platform 108 (or vessel), a surface unit 110, and other surface equipment 109. The surface unit 110 may include one or more units, tools, controllers, processors, databases, etc., located at the platform 108, on a separate vessel, and/or near to or remote from the wellsite 100.

The subsea system 104 includes a conduit 112 extending from the platform 108 to subsea equipment 111 at a sea floor 114. The subsea equipment 111 includes a low marine riser package (LMRP) 116 positioned about a wellhead 119 of a wellbore 120. As shown in the detailed view of the LMRP 116, the LMRP may include pods 121 and a BOP 122 with ram assemblies 126 for shearing a tubular 118 and/or sealing about the tubular 118 to seal the wellbore 120.

The surface system 102 and subsea system 104 may be provided with one or more control units, such as the surface unit 110 and/or the subsea unit 124, located at various locations to control the surface system 102 and/or the subsea systems 104. The control units 110, 124 may include or be coupled to actuators, such as the regulators 123, for activating the wellsite equipment, such as ram assemblies 126.

The pattern detection system 101 may be provided to monitor operation of various wellsite equipment, such as the LMRP 116. The pattern detection system 101 may include sensors S and pattern detector(s) 130. The sensors S may be provided as part of the pattern detection system 101 or be coupled thereto. One or more sensors S may be coupled to various wellsite equipment about the wellsite 100, such as the LMRP 116 and BOP 122, to collect wellsite signals.

The pattern detector 130 may be positioned at various locations about the wellsite 100, such as in or coupled to the sensors S, the LMRP 116, the surface unit 110, and/or other wellsite equipment to receive wellsite signals therefrom. Part or all of the pattern detection system 101 may be incorporated into and/or coupled to various onsite and/or offsite wellsite units, such as the surface units 110, subsea unit 124, and/or offsite units 125, via wired and/or wireless communication links 128.

The pattern detector 130 may be coupled to the sensors S to collect equipment signals 131 therefrom and provide feedback. The pattern detection system 101 may be used, for example, to communicate with various locations (e.g., surface unit 110, subsea unit 124, offsite unit 125, etc.), determine irregularities from the equipment signals, provide feedback (e.g., graph, reports, alerts, etc.), and/or adjust operations (e.g., mitigation), as is described more fully herein.

Figure 2:
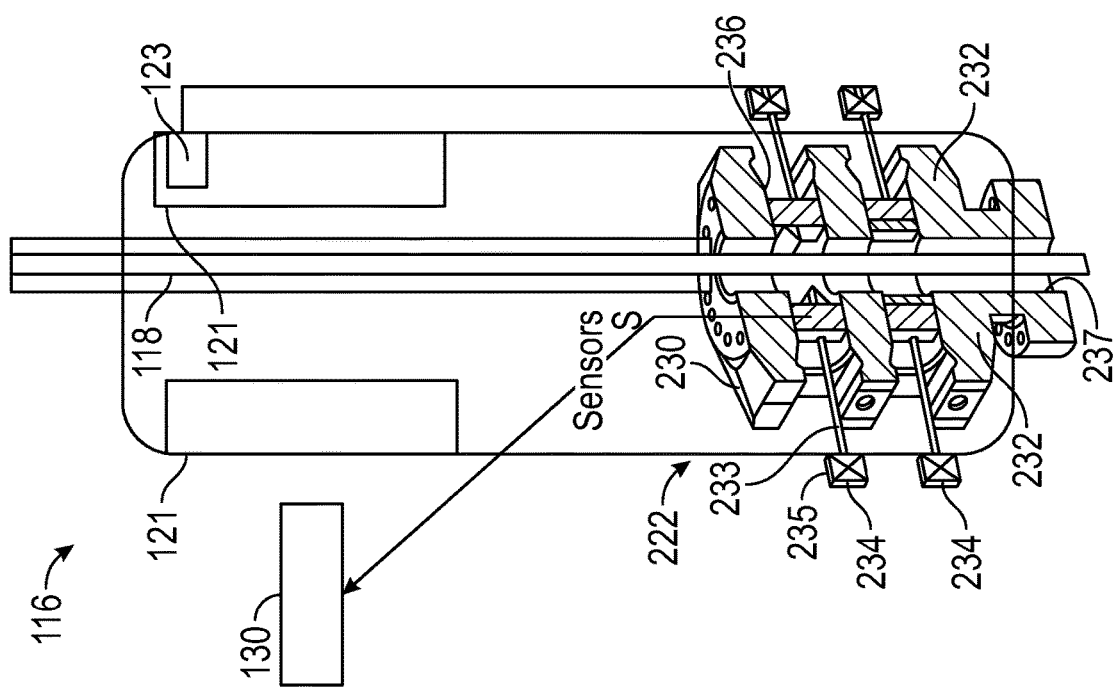
FIG. 2 is a vertical cross-sectional view depicting a BOP of the LMRP in greater detail.

FIG. 2 depicts the LMRP 116 with an example BOP 222 usable as the BOP 122 of FIG. 1. The LMRP 116 may include two Pods 121 and multiple (e.g., about 7) hydraulic regulators 123. The regulators 123 may be coupled to the BOP 222 and used to selectively provide pressure thereto.

The BOP 222 includes a housing 230 with multiple ram assemblies 236 with rams 232 movably positionable therein by actuators 234. The actuators 234 are driven by pressure from the regulators 123. The rams 232 are positionable in passage 237 of the housing 230 and selectively movable into engagement with the tubular 118 for sealing and/or severing the tubular 118 in the housing 230. Examples of BOPs are provided in US Patent/Application Nos. 20110000670; 7,814,979; and 7,367,396, previously incorporated by reference herein.

The BOP actuators 234 may include a ram rod 233 and cylinder 235 hydraulically activated by the regulators 123 in pod 121 (FIG. 1) for selectively extending and retracting the rams 232 to close and form a seal about tubular 118. The actuators 234 may be selectively activated by regulators 123 in pod 121 and/or units (e.g., 110, 124 of FIG. 1). For example, the regulators 123 may be hydraulically activated to reduce input pressure to a lower preset pressure (governed by a pre-tensioned spring or hydraulic pilot pressure), by passive actuation of a seal carrier that impacts an orifice in order to maintain a working pressure (output pressure) of the BOP 122 at close proximity to a preset pressure.

If the working pressure of the regulator 123 is below a preset pressure, a seal carrier in the regulator 123 may open an orifice allowing flow in. If the working pressure is higher than the preset pressure it may force the seal carrier to constrict the orifice, thereby preventing flow. The regulators 123 in each Pod 121 may have a hierarchy that steps down a conduit pressure according to three levels (e.g., of about −5000 psi (−34.5 MPa), to about −3000 psi (−20.7 MPa), and to about −1500 psi (−10.3 MPa)), with different functions of the BOP 122 operating at one of the three pressure levels.

The sensors S may be provided about the LMRP 116 to monitor performance of the rams 232, actuators 234, and/or regulators 123 or other devices used to hydraulically operate the rams 232. The sensors S may be positioned about the LMRP 116 for collecting BOP signals, such as pressure, temperature, position, force displacement, ram cycle, valve pressure, fluid flow, equipment, rubber, historical data, and/or other equipment parameters. These measured BOP signals may provide information about operation of the BOP 222, such as whether the rams are properly sealing about the tubular 118. For example, the sensors S may be pressure transducers and/or flow meters coupled to inlets and/or outlets of the regulators 123 to detect pressure changes which may indicate potential hydraulic failures (e.g., leakage) that may cause the rams 232 to malfunction.

The pattern detector 130 may be coupled directly or indirectly to the BOP 222 for receiving the measured BOP signals therefrom, for example, from the sensors S. Measured signals may include various parameters, such as the number of cycles or engagements, the amount of force and/or time closing time of the rams (the time needed to drive the rams 232 with the rod 233 and cylinder 235 of the actuator). Such signals may be measured by sensors S, and monitored by the pattern detector 130 to indicate irregular operation and/or potential failure thereof.

Figure 3:
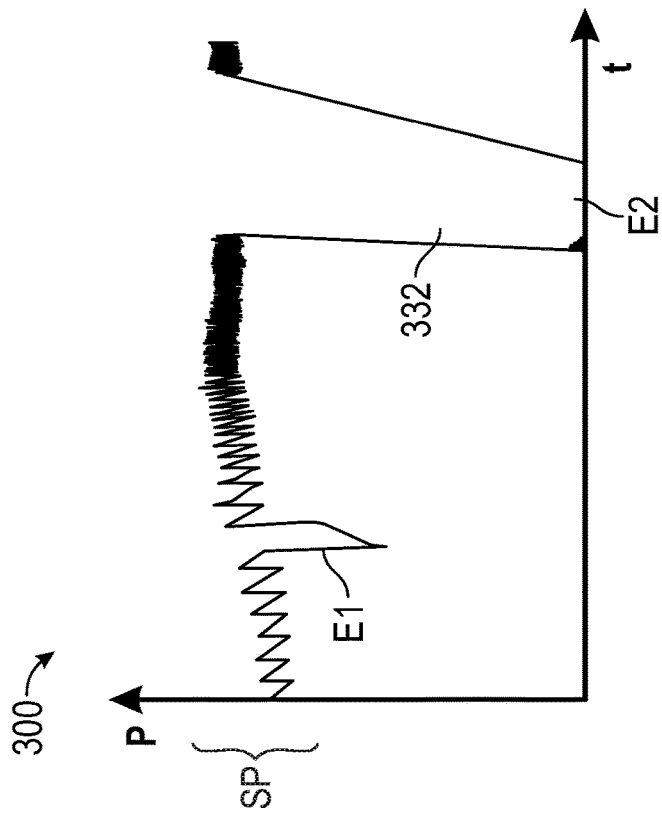
FIG. 3 is a graph depicting an equipment signals corresponding to the BOP.

FIG. 3 shows a graph 300 depicting an example BOP signal 332 that can be collected by the sensors S. Graph 332 plots pressure P (y-axis) versus time t (x-axis) for one of the regulators 123 of the BOP 222. As shown by this graph, the pressure may vary due to events, such as scheduled maintenance that occur during operation. As also shown by this graph, the pressure may fluctuate even during normal operation.

Graphs of one or more of the regulators 123 may be collected over time to define patterns for the regulators 123 when operating according to a pre-designed specification SP. Specifications for operation of the regulators 123 may be defined by, for example, equipment manufacturers, operators, oilfield service companies, government regulations, etc. As shown, the pressure fluctuates within the specification SP, except during maintenance at events E1, E2.

The pattern detection unit 101 may be coupled to the BOP 222 to collect information, such as the graph 300 of FIG. 3. This information may be gathered, analyzed and/or fed back to the BOP 222 via the pattern detection system 101 and/or the control units (e.g., 110, 124 of FIG. 1). This information may be used to determine, for example, if a deviation from normal operation has occurred which may require maintenance or operational adjustments to the regulators 123, BOP 222, and/or other portions of the wellsite 100. This information may be used, for example, by an operator and/or technical teams (e.g., offsite location 125) to make decisions, such as scheduling maintenance as is described further herein. In some cases, the information may automatically be fed back to the control units to make adjustments in real time or as needed.

The pattern detection unit 101 may also be used to collect signals and/or other information from various equipment over time to generate a library of defined patterns. The various defined patterns may be used to determine irregularities in equipment operation and make adjustments as needed. For example, a library of defined patterns for the BOP regulators 123 may be used to determine if current BOP signals perform as anticipated. The defined patterns may be built and/or re-defined over time, and then incorporated at the wellsite for use in situ as is described more fully herein.

Equipment MOdule—Library Mode

Figure 4:
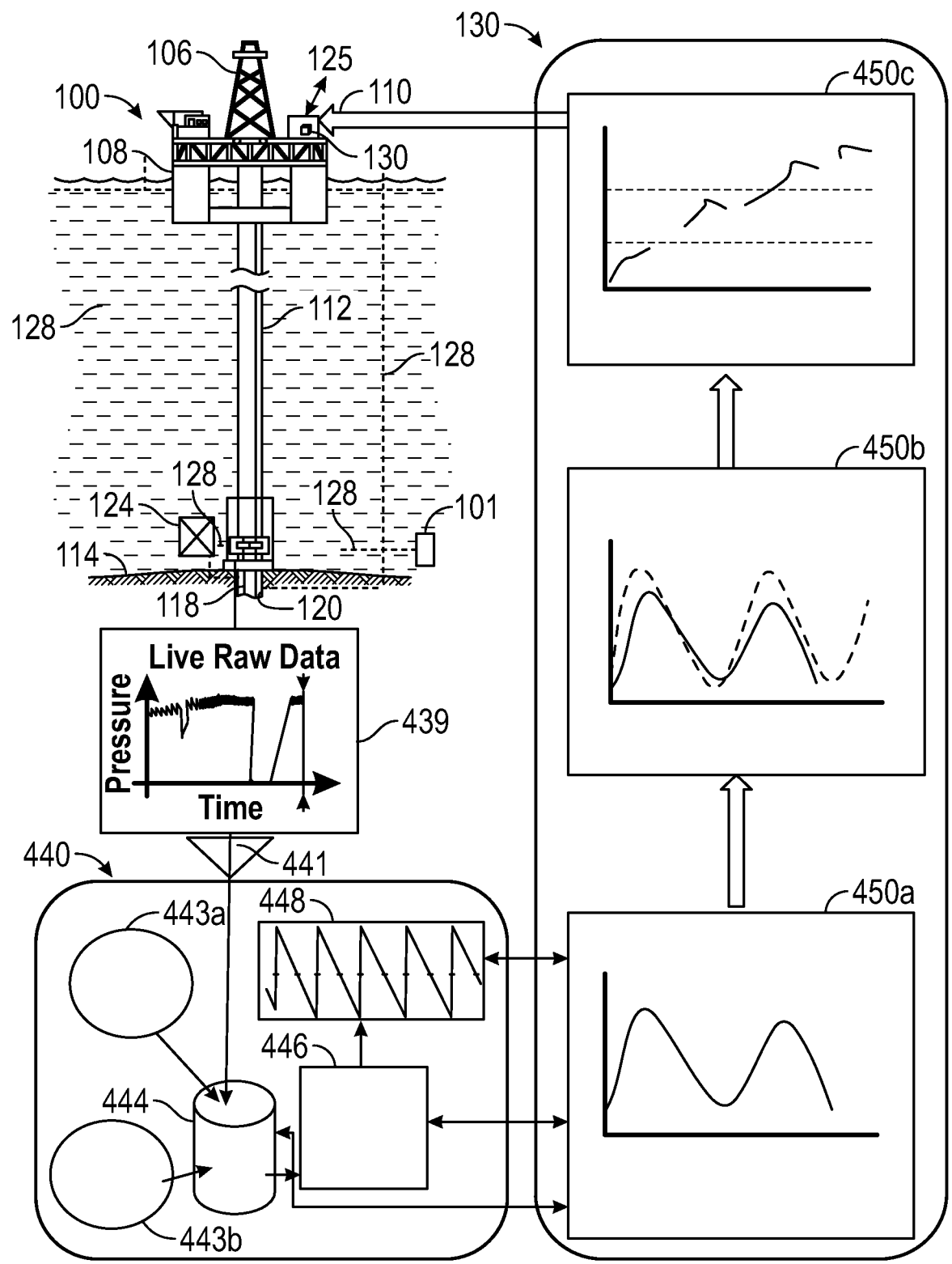
FIG. 4 is a schematic diagram depicting a pattern detector of the pattern detection system operating in a library mode.

FIG. 4 is a schematic diagram depicting another view of the wellsite 100 depicting a portion of the pattern detection system 101 of FIG. 1 in greater detail. As shown in this view, the pattern detection system 101 includes an equipment module 440 and the pattern detector 130 operated in a library mode. In library mode, the pattern detector 130 may receive wellsite signals 439 containing wellsite measurements or remotely collect such wellsite measurements to define patterns 448 therein. The wellsite signals 439 may be filtered (or de-noised) using filter 441.

The equipment module 440 includes one or more libraries 444 to collect historical data 443a, knowledge input 443b, and/or the wellsite signals 439 containing wellsite measurements. The library(ies) 444 may include databases and communication devices to receive and store information from one or more sources, such as on and/or offsite databases, experts, equipment information, maintenance logs, etc.

For example, the equipment signal 439 from the regulator 123 may be captured by the sensor S and/or the pattern detector 130. The equipment signal 439 may be collected at an average acquisition rate of around 0.4 Hz emanating from programmable logic controllers (PLCs) of the different subsystems and the main control system of the wellsite 100.

The equipment module 440 may collect, for example, structured data consisting of about 14 years of rig data from about 10 different BOPs (e.g., from the surface unit 110, subsea unit 124, and the LMRP 116). The wellsite signals 439 may be filtered (or de-noised) using filter 441.

The equipment module 440 also includes a pattern generator 446 to combine and process the measurements collected in database 444. The equipment module 440 may collect and aggregate structured data, such as the equipment signals 439, collected by the sensors S and usage data and unstructured data, such as maintenance logs of the wellsite equipment over a period of time. The pattern generator 446 may include a processor (CPU) capable of combining the measurements and detecting patterns in the combined measurements. The collected equipment signals 439 may be combined according to type of equipment, operation performed, events occurring, and/or other datum. The pattern generator may also include logic for combining data from one or more sources, such as sensors S and/or the offsite unit 125. The data may be combined using, for example, conventional software to merge, sort, and order the data according to predefined combinations.

The combined data may be used to define the patterns 448 of operation of wellsite equipment as schematically shown. Such patterns may be, for example, plots of pressure readings of the regulators 123 of the LMRP 116 of FIG. 1. The patterns 448 may be defined using, for example, pattern recognition techniques for combining and sorting the data and detecting patterns therein. Patterns may also be estimated heuristically (e.g., empirically) by comparing measurements of wellsite equipment during various operations.

The defined patterns 448 may be determined based on known specifications from equipment manufacturers, lab tests, and/or measured equipment runs defining expected operation of the equipment. Such patterns may be, for example, a pattern of pressure measurements expected during normal operation and/or specific events. The library 444 may maintain defined patterns for designed operation of the wellsite equipment. The defined patterns 448 may be updated and redefined as new information is added.

The pattern detector 130 includes a pattern characterization unit 450a, a pattern detection unit 450b, and a pattern classification unit 450c. The pattern characterization unit 450a as shown may receive the data from the database 444 and/or patterns 448 from the pattern generator 446 and characterize the equipment signal as relating to one of the defined patterns 448. The pattern detection unit 450b may be used to detect the defined patterns in the characterized equipment signal. The pattern classification unit 450c may be used to extract features from the defined patterns and classifying the extracted features.

Library Mode—Defining Patterns

Initially, the pattern detector 130 may operate in a baseline library mode to define initial patterns 448 for certain equipment signals of certain wellsite equipment. In the library mode, the pattern characterization unit 450a receives information from the library 444 and identifies trends in the measured signal. Within these trends, patterns may be determined in the equipment signal using, for example, conventional pattern recognition techniques and/or empirical methods of overlaying data from multiple measurements to identify repeat patterns in the wellsite signals. Knowledge, such as measurement logs, maintenance records, and expert input, may be used to eliminate and/or supplement data in the signals. The initial pattern(s) may be used as the defined pattern 448 during an initial use of the pattern detector 130.

Once initial patterns are generated, the pattern detector 130 may shift to a routine library mode. In the routine library mode, the pattern detector 130 may use the reference defined pattern 448 to characterize, detect, and classify patterns 450a-c. Equipment signals 439 may be gathered over time and fed into the pattern characterization unit 450a. Such equipment signals may be characterized as correlating to one or more of the initial patterns.

The pattern characterization unit 450a may continue to pass defined patterns back to the equipment module 440 as indicated by the arrows. The equipment module 440 may collect and compile the defined patterns 448 based on a volume of equipment signals over time. Detected patterns may be passed back into the equipment module 440 for incorporation into the library 444 and/or pattern generator 446 for generating defined patters for future use. The process may be repeated to further refine the defined patterns 448.

Once characterized as a defined pattern, the pattern detection unit 450b may look within the characterized equipment signal to detect the initial pattern within the characterized equipment signal. The pattern classification unit 450c may then be used to extract features from the characterized equipment signals and classify the extracted features.

The pattern detector 130 may be used in the offline mode to repeat the process of pattern characterization, detection, and classification 450a-c for various wellsite measurements to build the defined pattern 448, define normal operation, and predict failure. Once complete, the pattern detector 130 may be installed at the wellsite for in-situ use.

Figure 5B:
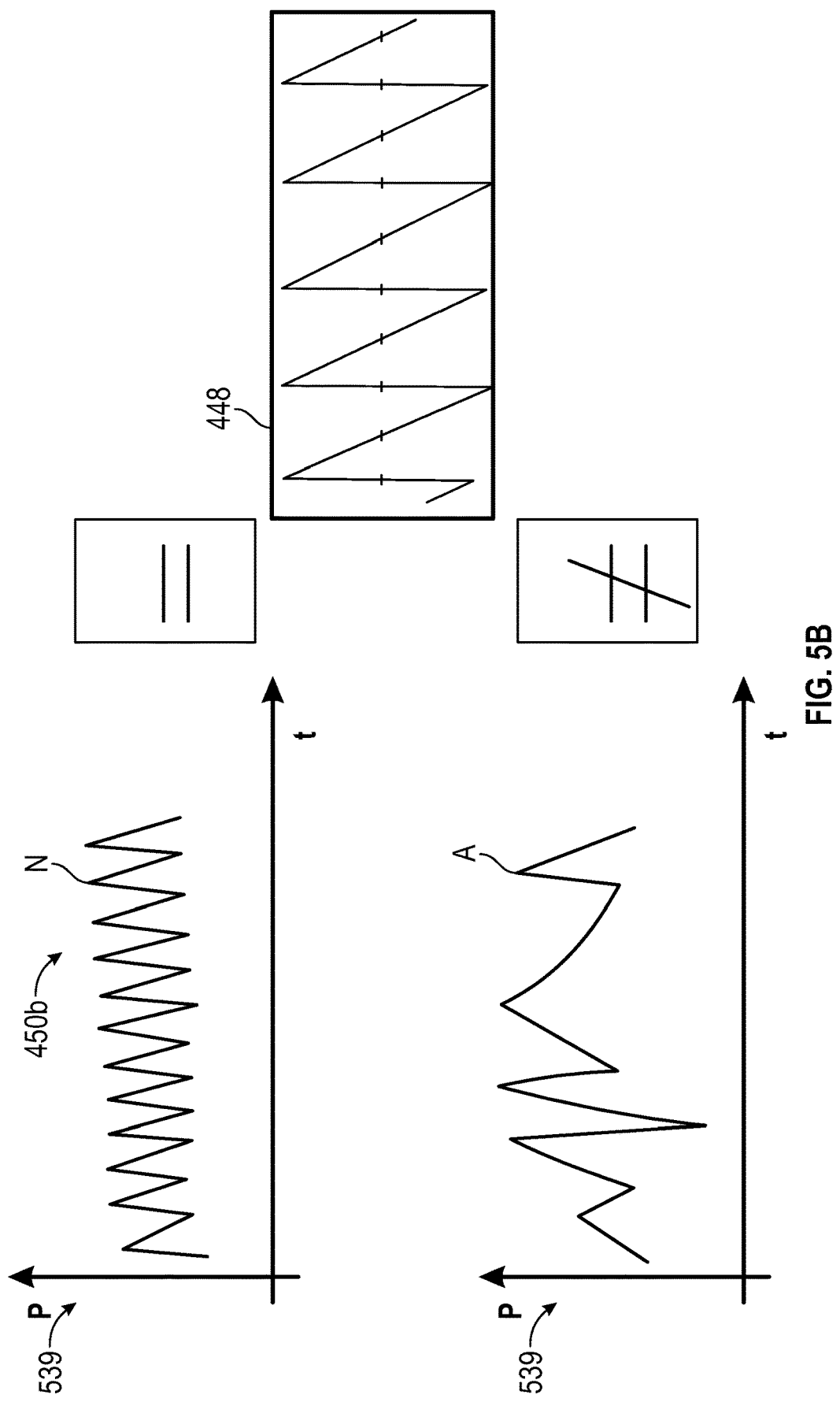
Figure 5C:
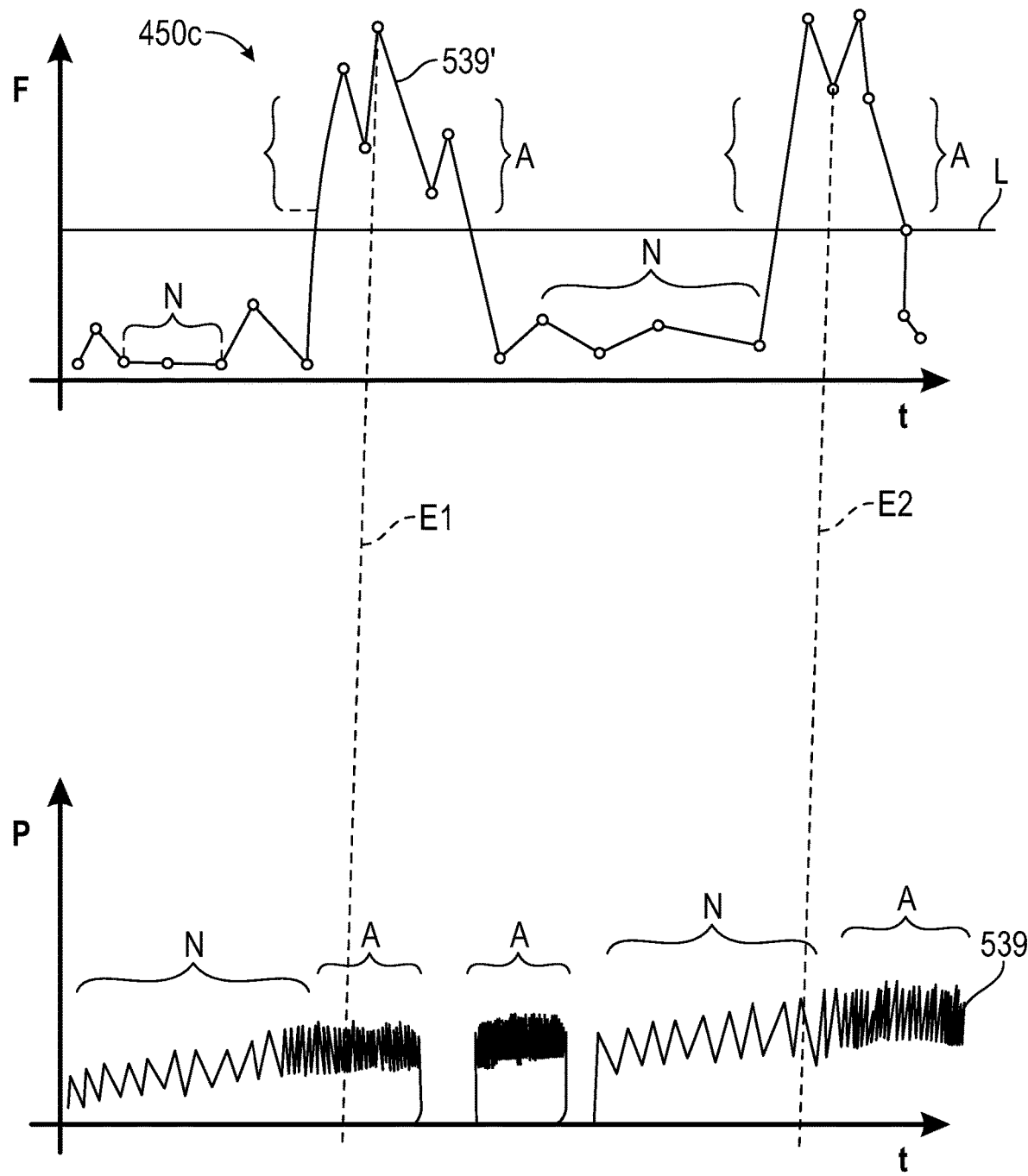

FIGS. 5A-5C are example images showing pattern characterization 450a, pattern detection 450b, and pattern classification 450c performed using the pattern detector 130 for pressure signals of a regulator 123 (FIGS. 1 and 2). These figures demonstrate a process of defining pattern recognition for the equipment signals by characterizing patterns in the signal using pattern characterization (FIG. 5A), pattern detection (FIG. 5B), and pattern classification (FIG. 5C) of known equipment signals and/or other information.

FIG. 5A shows an example equipment signal 539 for the regulator 123 characterized using the pattern characterization 450a. Based on historical knowledge and an examination of pressure signals P (y-axis) over time t (x-axis), the initial pattern may be roughly defined as a 'sawtooth' pattern. In the example of FIG. 5A, the pressure signal 539 fluctuates within the range of the specification SP before and after a maintenance event E. The maintenance event E may be one or more maintenances, for example, a loss in pressure that requires repair of the regulator 123. The event E may represent multiple maintenance events that may be considered (e.g., by overlaying/combining multiple example patterns where maintenance events occur). As shown in an expanded view of a portion of the pressure signal, a change in frequency of fluctuations in the pressure occurs just before the event E. During this change, the fluctuations increase from a normal rate N to an abnormal rate A, thereby providing an indication of an approaching event. The shape of the fluctuations may be characterized as being similar to the initial 'sawtooth' pattern.

As shown in FIG. 5B, the pattern detection unit 450b may be used to detect a sawtooth pattern within portions N, A of the characterized signal 539. The portion N correlates to the sawtooth pattern 448. Based on knowledge input of the operation of the regulators 123, the pressure outlet of the regulator 123 represented by the normal portion N of the pressure signal 539 may be described as having a 'sawtooth' pattern 448 when the BOP 122 is idle. This may be due to small leaks downstream from the BOP 122, which can be described as normal. The detected sawtooth pattern in the normal pressure signal N is assumed to correspond to the idle operational mode of the regulator 123. Based on the known sawtooth pattern 448, it may be assumed that a low frequency of a sawtooth pattern in a measured signal for the regulator 123 indicates a proper operation of the regulator 123.

However, if a large leak occurs downstream of the regulator 123, or inside the regulator causing working pressure to deplete, the frequency of the sawtooth pattern may be expected to increase as indicated by the abnormal portions A of the pressure signal 539 of FIG. 5B2 which does not correlate to the 'sawtooth' pattern 448. Based on the known sawtooth pattern 448, it may be assumed that a high frequency of the sawtooth pattern in the abnormal pressure signal A may indicate irregular operation of the regulator 123. Examples of pattern recognition techniques that may be used are provided in Syeda-Mahmood, Tanveer, David Beymer, and Fei Wang. "Shape-based matching of ECG recordings." Engineering in Medicine and Biology Society, 2007. EMBS 2007. 29th Annual International Conference of the IEEE (2007) and in Lin, Jessica, and Yuan Li. "Finding structural similarity in time series data using bag-of-patterns representation," Scientific and Statistical Database Management, Springer Berlin Heidelberg (2009), the entire contents of which is hereby incorporated by reference herein.

As shown in FIG. 5C, the pattern classification unit 450c may be used to extract features F, such as frequency, peak value, etc., from the pressure signal 539. FIG. 5C shows the pressure signal 539 of FIG. 5A plotted adjacent to a frequency plot 539'. The frequency plot 539' plots frequency (y-axis) versus time t (x-axis) for the pressure signal 539. For each normal N and abnormal A portion of the pressure signal 539, features of the signal may be extracted. Feature extraction may be performed, for example, by selection or derived using geometry of the pressure signal (e.g., slope, frequency, etc.).

A level L is depicted to separate high and low frequency levels corresponding to abnormal and normal operation, respectively, of the regulators. This level L indicates that the normal operation N of the regulator falls below a given frequency level, and that an increase above such frequency level indicates abnormal operation A. This classification may be used to assign a risk level for alerting potential failures of the regulators. The level L may be defined, for example, using multiple features (e.g., frequency, peak value, etc.) to determine a risk level on the multiple features using a machine learning approach, such as conventional K nearest neighbor or decision trees techniques, to define the level L which relates to group behavior of the multiple features.

In this manner, historical structured and unstructured data may be used to generate defined patterns for comparison with equipment patterns monitored during operation. These comparisons may be used to characterize equipment as having healthy vs. unhealthy behaviors. Classification techniques may then be used to detect certain operational behaviors and to classify them into normal or abnormal behavior. The extracted features may be classified according to a risk index indicating high, medium, and low risk. Mitigation, such as maintenance schedules, may be defined based on the risk index as is described further herein.

The process of FIGS. 5A-5C may be repeated using the pattern detector 130 of FIG. 4 until sufficient confidence is established in the patterns and their ability to predict failures. Once confidence is established, the library, detected patterns, and pattern detector 130 may be installed at the wellsite for in-situ pattern detection. The pattern detection methodology may be applied to the regulators 123 in the Pods 121 to allow continuous monitoring of the pressures at different levels of the systems. For example, leak detection, leak isolation, and an inference of the health of the regulators (and/or components downstream therefrom, such as side pocket mounted valves, compensated chamber solenoid valves, and shuttle valves).

Wellsite MOdule—In Situ Mode

Figure 6A:
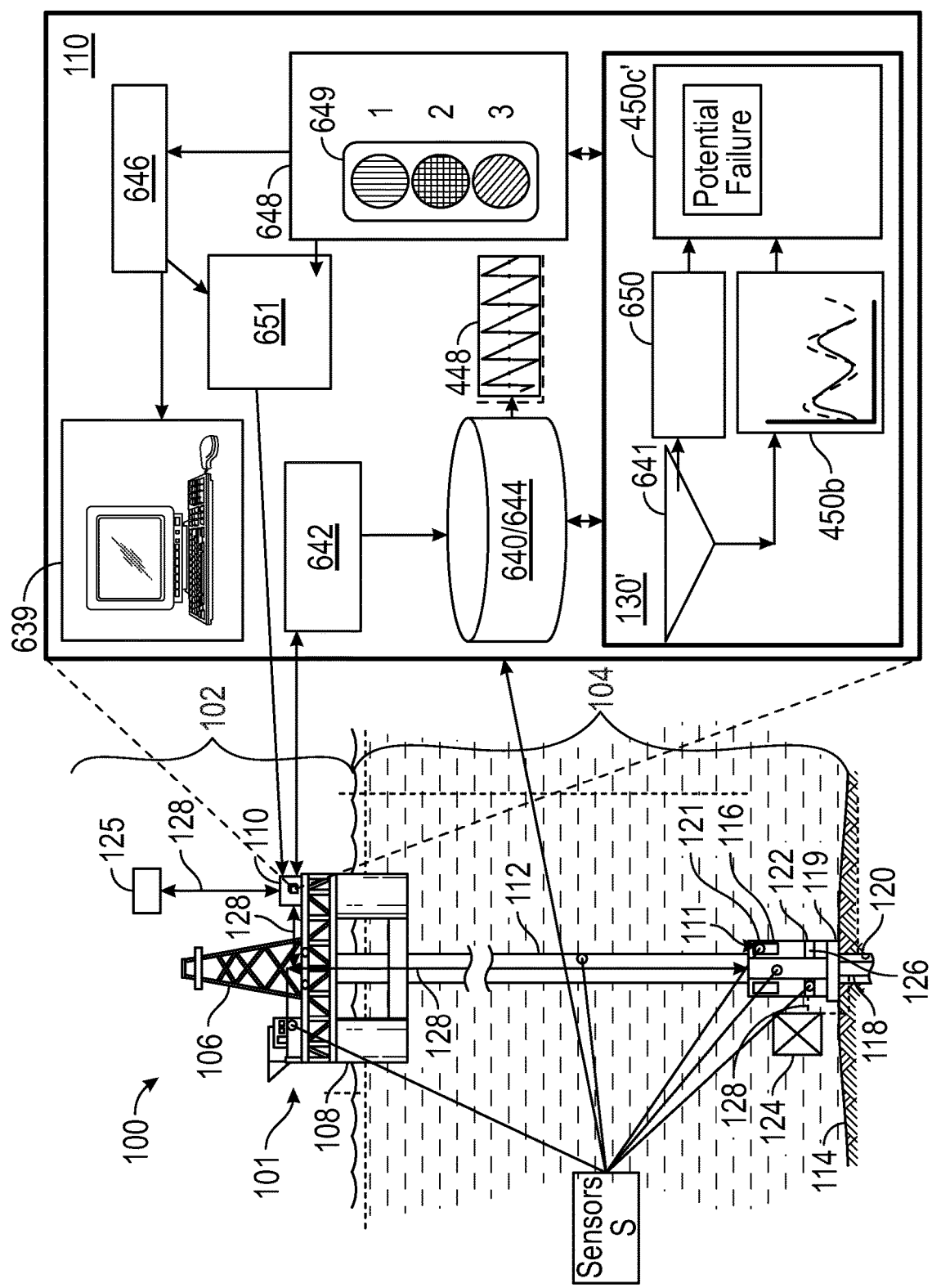
FIGS. 6A-6C are schematic diagram depicting various views of operation of the pattern detector in an in-situ mode.
Figure 6B:
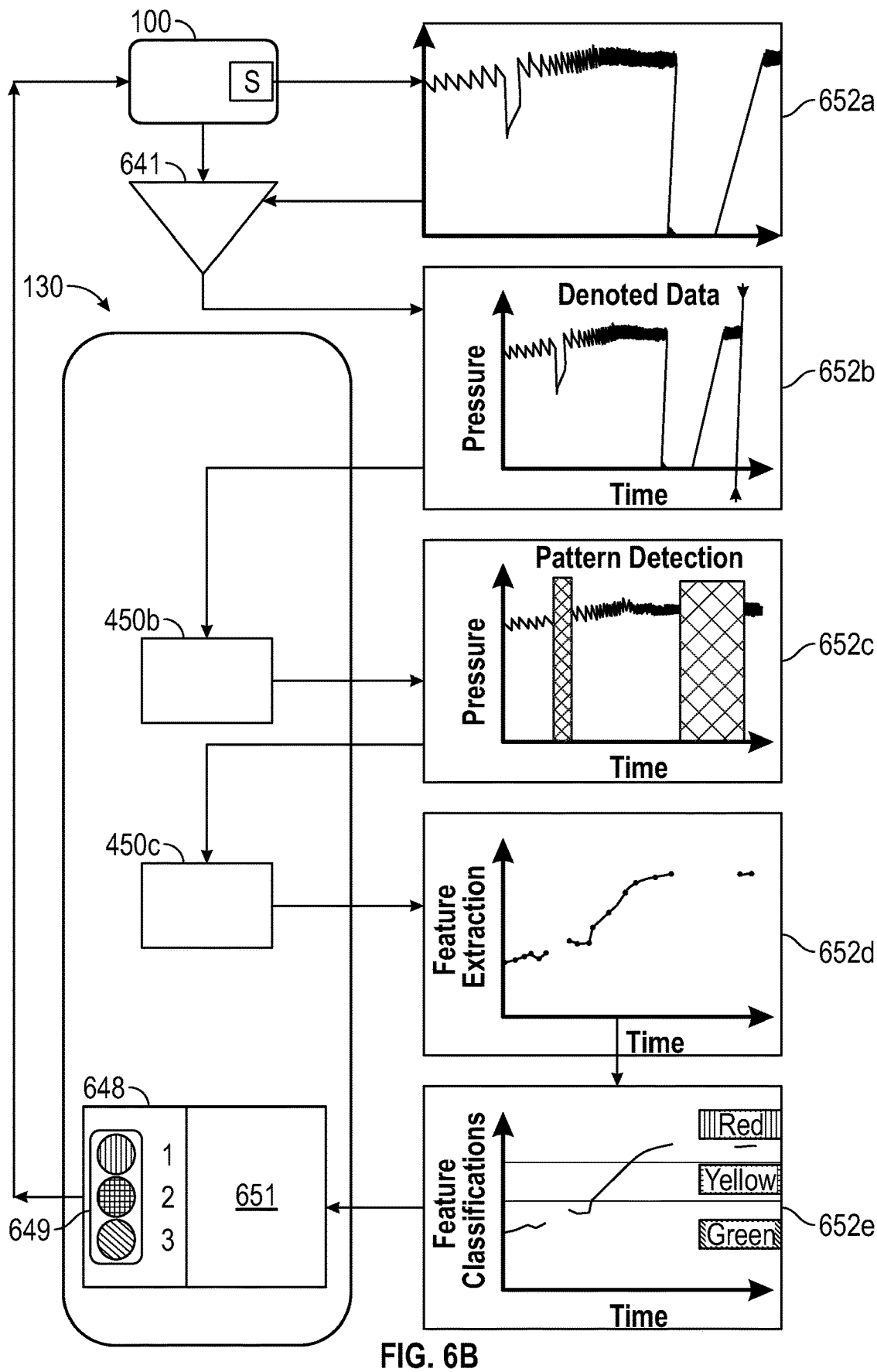

FIGS. 6A and 6B show views of an in situ (and/or real-time) pattern detector 130' used in a wellsite unit at the wellsite 100. In the example shown, the pattern detector 130 is installed in the surface unit 110, but could be positioned in or in communication with other locations at the wellsite 100 (e.g., in the LMRP 116, or at the offsite location(s) 125, etc.).

The surface unit 110 also includes an input/output device 639, a transceiver 642, an equipment module 640, a validator 646, feedback 648, and actuator 651. Part or all of these components of the surface unit 110 may be part of or coupled to the pattern detector 130 for operation therewith. The surface unit 110 and/or detector 130 may be coupled to portions of the wellsite and/or the various wellsite equipment for operation therewith.

The input/output device 639 may include a display, keyboard, mouse, and/or other device for use by an operator at the wellsite. The operator may use the input/output device 639 for sending/receiving information to/from the pattern detection system 101, the offsite location 125, and/or the wellsite equipment (e.g., LMRP 116).

The transceiver 642 may be any communication device capable of communicating with the units 110, 124 and the wellsite equipment for sending and/or receiving power, data, and/or communication signals. The transceiver 642 may be wired or wirelessly coupled to the various components for passing the signals. The transceiver 642 may be capable of communication with various onsite, offsite, surface, and/or subsea locations. The transceiver 642 may receive equipment signals from the wellsite equipment and/or sensors containing collected measurements.

The equipment module 640 may be similar to the equipment module 440, and include one or more onsite and/or offsite databases coupled to the welllsite for collecting the wellsite measurements directly therefrom. Optionally, the equipment module 640 may be separate from the surface unit 110. One or more libraries 644 may be provided separate from or integral with the surface unit 110 and/or in situ module 130 to receive and store equipment signals from the sensors S in real-time. The library 644 may also generate and/or store one or more of the defined patterns 448 for use in with the pattern detector 130, for example, to detect potential failures and/or determine maintenance needs.

The pattern detector 130 may be incorporated into the surface unit 110 for onsite operation. The pattern detector 130 may be coupled to the sensors S to receive the equipment signals from the sensors S and/or the equipment module 640 in real-time as schematically shown. Such signals may be filtered (or de-noised) with a filter 641 and passed into the equipment module in situ pattern detector 130'. The pattern detector 130' may be used to determine irregularities in operation of the wellsite equipment using the pattern detection unit 450b, and the pattern classification unit 450c as described herein (e.g., FIGS. 5A-5C).

As also schematically shown, the pattern detector 130' may incorporate or be used with other means for failure detection 650, such as rule based or other conventional pattern detection techniques. Examples of rule based techniques are provided in U.S. Pat. No. 4,642,782, the entire contents of which are hereby incorporated by reference herein. The results may be combined with the pattern detection 450b, and used for the pattern classification 450c. The rule based failure detection 650 may also be used as a validator 646 (or a portion thereof).

The results may be returned to the wellsite 100 using feedback 648. The feedback 648 may be used to provide risk mitigation to the wellsite. The feedback 648 may include providing a risk index 649 with alert levels defining an acceptable, borderline, or an irregular operating condition. For example, the risk index 649 may be colored lights that are set to red at level 1 for unacceptable (irregular) conditions, yellow for conditions at level 2 that are trending away from the acceptable conditions, and green at level 3 for acceptable conditions.

The feedback 648 may also send a feedback signal, such as an alert, to notify onsite and/or offsite personnel of such conditions for taking action. For example, an alert may be triggered to produce a snapshot of the equipment signal around the diagnosis of the fault, and deliver the signal to offsite locations 125 (e.g., a group of SMEs).

The feedback 648 may also be in the form of a control signal sent to the wellsite to perform wellsite operations in response to the results provided by the pattern detector 130', 130'. The actuator 651 may be used to perform mitigation in response to predicted failures. Such mitigation may include, for example, adjusting wellsite operations to change equipment and/or equipment operations based on the defined condition(s). For example, the actuator 651 may receive a signal from the feedback 648 to make a change at the wellsite. The actuator 651 may be, for example, an adjustment in the hydraulics (e.g., pressure sent by regulator 123) used to operate the BOP 122 and/or to adjust operation of the ram assembly 126 to ensure a proper seal. The adjustments may be communicated to the operator (e.g., via I/O 639) at the wellsite 100 and/or directly to the wellsite equipment (e.g., via actuator 651) to make the necessary adjustments to the wellsite equipment. Maintenance on the equipment may also be scheduled for out of range and/or suspect equipment.

The feedback 648 and/or risk index 649 may be validated by the validator 646. The validator 646 may be, for example, means for comparing the potential failures with predictions made using other techniques, such as the rule based detection 650. Optionally the features may be examined by experts, such as subject matter experts (SMEs) in the field or offsite location 125 to visually confirm the detected pattern, the failures, and/or the classifications, as well as the risk index assigned thereto. For example, the validator 646 may be used to visually confirm the presence (or absence) of the detected pattern (e.g., a sawtooth), the state of the pattern (e.g., accelerating sawtooth). The detected failures may be confirmed with other techniques, such as manual or automated examination of surface equipment to detect symptoms, such as surface pumps running too often while they are not expected too or the system demanding more fluid on the mixing side than needed.

FIG. 6B shows another view depicting an operational example using the pattern detector 130' in the in-situ mode at the wellsite 100 to monitor pressure of hydraulic regulators 123 of a BOP 116 as shown in FIG. 1. The pressure signal 652a sensed by sensors S at wellsite 100 may be received in raw form by the pattern detector 130'. The detector module 130' operating in an situ mode may use the patterns 448 generated from detector module in the library mode (e.g., emanating from the historical studies) to consume live feeds of structured and unstructured data (see, e.g., FIG. 4). The pressure signal 652a may be denoised by filter 641 to remove distortions from the equipment signal as indicated by graph 652b.

The pattern detection unit 450b may detect patterns in the denoised signal (see, e.g., FIG. 5B). The detected patterns 652c may be used to extract features from measured data using the pattern classification 450c as indicated by 652d (see, e.g., FIG. 5C), and the extracted features classified as indicated by 652e. The classified measurements may be fedback 648 to the wellsite 100 using the risk index 648 and by performing mitigation (e.g., by actuator 651), such as scheduling equipment maintenance.

Figure 6C:
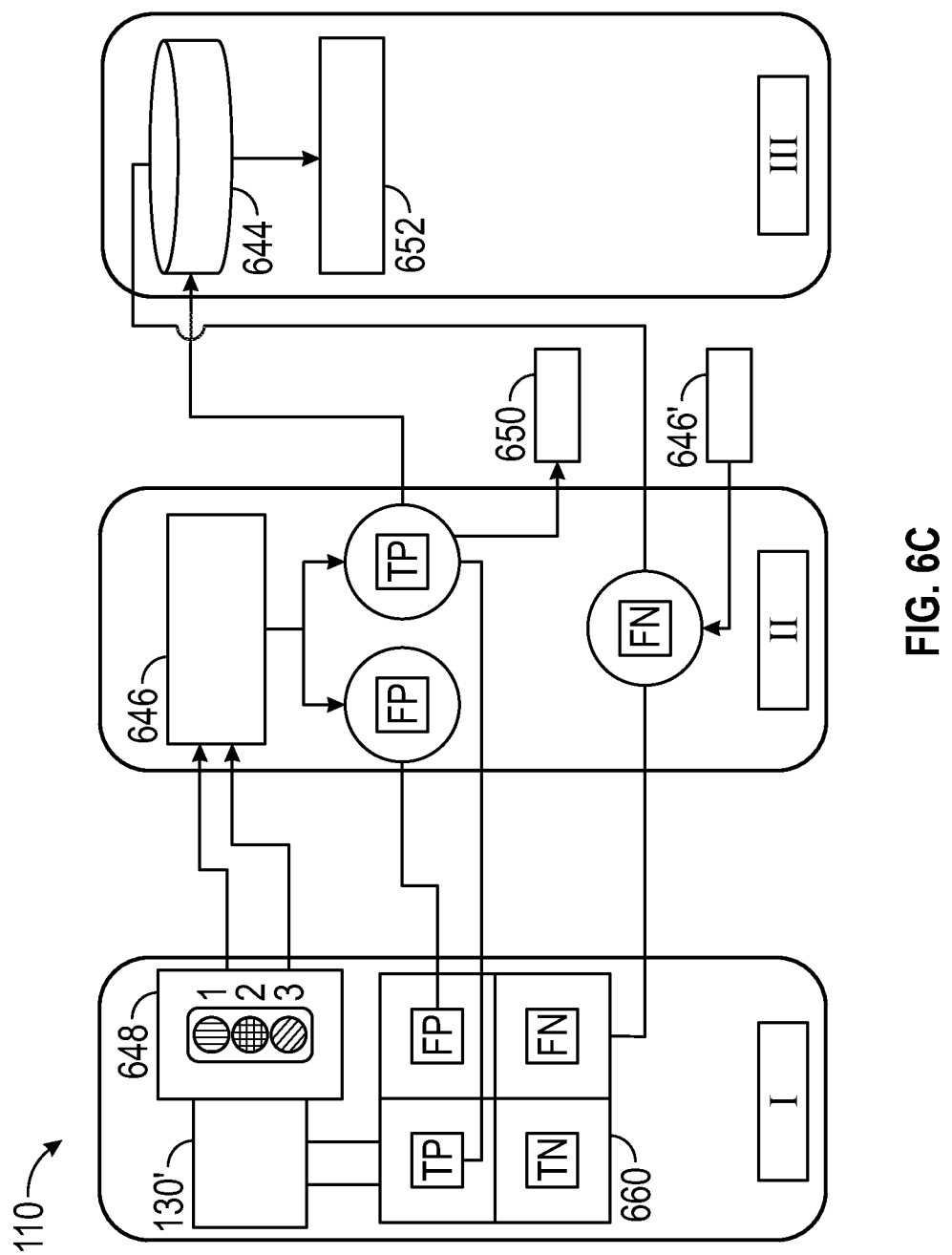

FIG. 6C shows another view of operation of the in situ pattern detector 130'. As shown in this view, pattern detection may involve three stages, namely failure detection Stage I, failure validation Stage II, and failure diagnostics Stage III. Failure prediction involves taking detected failures (e.g., 652a-e) using, for example, pattern detector 130' to generate predicted failures as shown in FIGS. 6A and 6B.

A confusion matrix 660 may be used to separate the predicted failures into true positives (TP), false positives (FP), true negatives (TN), and false negatives (FN). The confusion matrix 660 may be means, such as pattern generator 446, capable of combining/sorting the results into classes of true/false and positive/negative results. For example, the classifications as shown in graph 652e may be considered and sorted using the confusion matrix 660. As shown in Stage II, outputs may be may be sent from the feedback 648 to the validator 646 as indicate by the arrows. The validator 646 may then be used to consider the predicted failures that fall into Group 1 (or 2) as potential positives, TP and FP. The validator 646 may examine these predicted failures to confirm false positives and classify them as such in the confusion matrix 660.

For those items identified as potential TP, the validator 646 may confirm the true positive and add them to the confusion matrix 660 and send the potential failure to the field for mitigation using actuator 651. FNs may be defined by a validator, such as a field agent (or SME or other personnel) 646' and also sent to the confusion matrix 660. After passing through Stage II, the validated TP, FP, TN, and FNs may be stored in the equipment module 640. Failure diagnostics may also be performed on the validated TP, FP, TN, and FNs.

In an operational example, during Stage I, the pattern detector 130' may trigger an alert if the yellow (group 2) or the red (group 1) states are detected by the feedback 648. Stage II collects the alert(s) which may contain a comprehensive snapshot of the equipment signal, and contact the validator 646 to conduct an "investigation". If the validator 646 confirms the presence of anomalous behavior, the output is labeled as a TP which is be communicated back to the confusion matrix 660 of the pattern detector 130', forwarded to actuator 651 (e.g., field mitigation), and to the library 644 in Stage Ill. The library 644 may be used to store failures collected by the system. If the validator 646 finds that the alert is false (FP), it may be pushed back to the confusion matrix 660.

Where a failure happens in the field and the framework missed, this may be labeled by the validator as an FN which may be communicated back to the confusion matrix 660, as well as being forwarded to the library 644. In Stage Ill, the library may be used as a diagnostics database, which can be used for reinforcement of the library to update defined patterns. In cases where a large rate of FP or FNs are detected, the library and the defined pattern used with the particular equipment signal may need adjustment. The equipment signals and detected FP and FNs may be input into the library to update the defined patterns. Failure diagnostics 652 may be used, for example, to combine failures collected by the library 644 and associated data (e.g. corresponding symptoms, detection outcomes, etc.) relating to such failures.

Figure 7A:
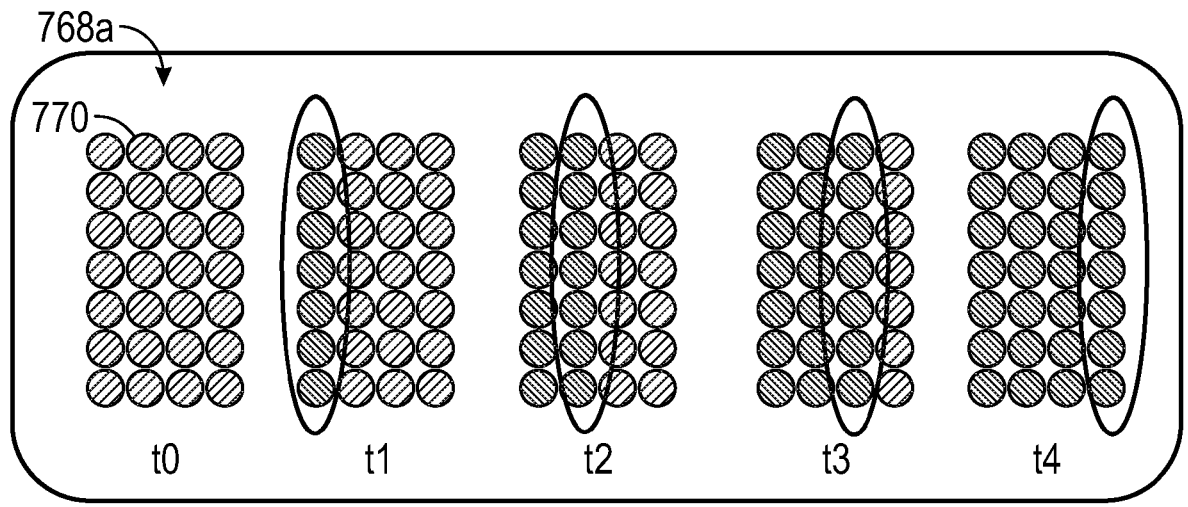
FIGS. 7A and 7B are schematic diagrams depicting preventative and predictive maintenance schedules, respectively.
Figure 7B:
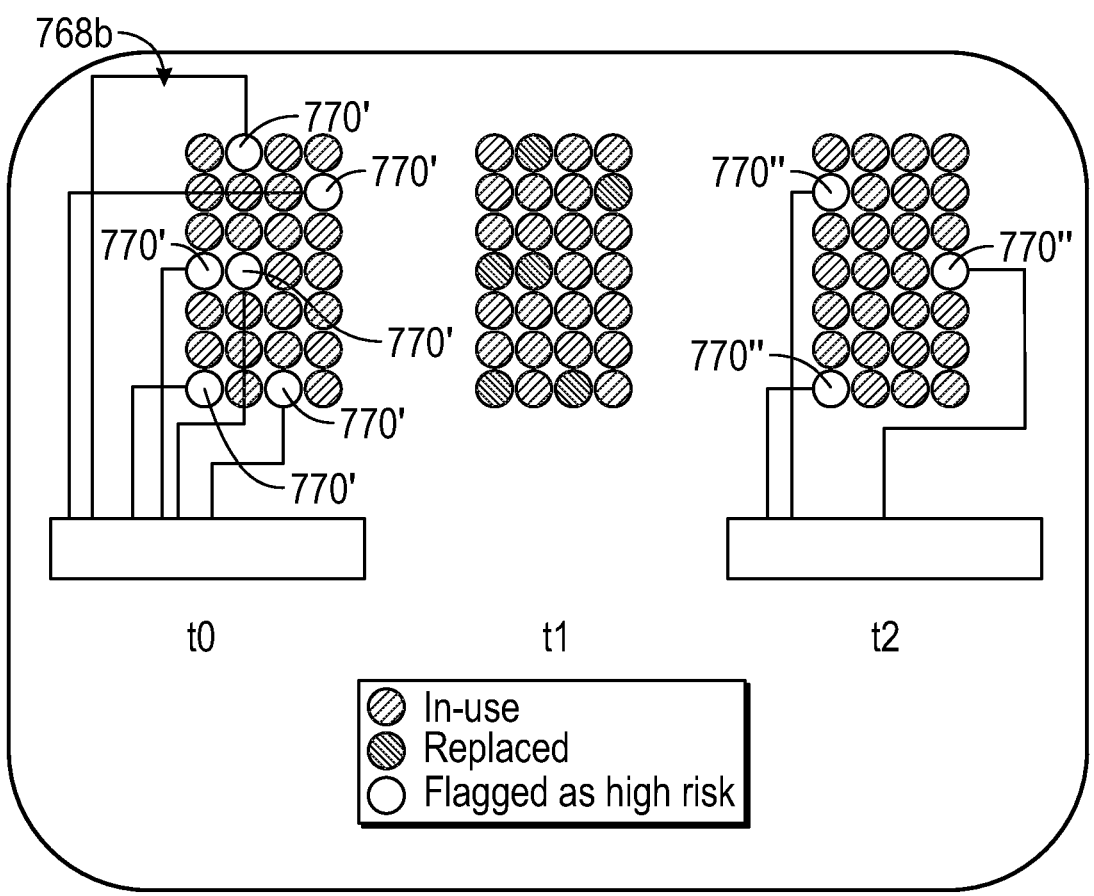

FIGS. 7A and 7B are schematic diagrams depicting example mitigation that may be performed based on the resulting classifications and risk index generated using the pattern modules herein. The mitigation may be, for example, performing repairs and/or maintenance of wellsite equipment. Such maintenance may be performed based a pre-defined schedule 768a as shown in FIG. 7A, or based on a condition-based schedule 768b based on irregular operations determined by the pattern detector 130 as shown in FIG. 7B.

FIG. 7A depicts an example pre-defined maintenance schedule 768a may be based on specifications (e.g., equipment lifespan, client requirements, government regulations, etc.) as shown in FIG. 7A. As shown in FIG. 7A, each piece of equipment 770 at the wellsite 100 is represented by the circles shown at time t0. Maintenance of this equipment 770 is performed according to preset timing based on, for example, routine maintenance, client requirements, government regulations, etc. In an example, based on the assumption that equipment may fail within 1 year, maintenance may be scheduled to replace each piece of equipment annually to statistically assure proper operation. To do so, maintenance may be scheduled within 11 months to replace the equipment within 1 year. To complete the necessary replacement, the equipment may be replaced in groups (or batches) each week (at times t1-t4) starting at month 11 until all equipment is replaced as indicated by the circled equipment.

The schedule may be pre-defined based on a study by the BUREAU of SAFETY AND ENVIRONMENTAL ENFORCEMENT available at http://www.bsee.gov/Technology-and-Research/Technology•Assessment-Programs/Reports/600-699/DataAnalysis-Report-2650788-DAS•C1D. The meantime to failure of BOPs may be about 48.1 days with <5% of maintenance activity being corrective and >95% being proactive maintenance, including scheduled testing, troubleshooting, and condition-based maintenance. In another example, scheduled testing may be performed based on a 25% replacement rule at the end of every well. The 25% rule consists of changing 25% of all hydraulic valves, and consumables at the end of every well, which is every 3-6 months. The schedule may require complete replacement of each component of both Pods of a BOP every two years. The removed Pod may then be fully maintained in preparation for the next cycle.

FIG. 7B is an example of condition-based maintenance schedule. As shown by these figures, maintenance of equipment may be performed, for example, as mitigation of actual and/or potential failures of wellsite equipment. As shown in FIG. 7B, maintenance of equipment 770 may be based on performance of the equipment as detected using the pattern detector 130' as shown in FIGS. 6A-6C. As shown in time t0, certain equipment may be flagged 770' as posing a risk which requires mitigation. In time t1, repairs may be completed. The process may be repeated at time t2 as new equipment issues 770" are identified. In this manner, maintenance may be scheduled based on an evaluation of measured signals directly from the wellsite equipment. Since wellsite equipment may be monitored in real time to identify potential failures, maintenance may be performed based on in situ, real-time measurements.

As also shown in FIG. 7B, certain equipment may be identified as posing a risk which requires replacement as indicated by the highlighted circles. A higher priority may be assigned for replacement of equipment classified as having high risk (group 1), a medium priority may be assigned for replacement of equipment classified as having a medium risk (group 2), and a low priority may be assigned for replacement of equipment classified as having a low risk (group 3).

Some combination of various schedules may also be provided. For example, condition-based maintenance may be used to define which equipment receives highest priority for maintenance based on pattern detection. The priority may also be adjusted or defined by taking into consideration the age of the equipment so that the equipment is replaced within a given lifespan.

FIG. 8 is a flow chart depicting a method 800 of pattern detection for wellsite equipment. The method involves 872—sensing equipment signals of wellsite equipment, 874—denoising the measured signal, and 876—defining patterns for the wellsite equipment when operating according to pre-designed specifications (FIG. 4). The defining 876 may involve characterizing the equipment signals over time, building a library of defined patterns based on at least one of recorded equipment signals, historical data, knowledge input, etc.

The method 800 may also involve 878—determining irregularities in operation of the wellsite equipment by detecting a known pattern in the characterized measured signal (FIGS. 6A-6C) by characterizing the equipment signals according to the defined patterns (FIG. 5A), detecting the defined patterns in the characterized equipment signals (FIG. 5B), and classifying the detected defined patterns by extracting features from the detected defined patterns and assigning classifications for the extracted features (FIG. 5C).

The method 800 may also involve 880 providing feedback to the wellsite based on the classifications and 882 validating the classified extracted features. The providing feedback 880 may involve, for example, actuating the wellsite based on the detected irregularities and/or providing a risk index based on the classifications.

The methods may be performed in any order, or repeated as desired. Various combinations of the methods may also be provided.

It will be appreciated by those skilled in the art that the techniques disclosed herein can be implemented for automated/autonomous applications via software configured with algorithms to perform the desired functions. These aspects can be implemented by programming one or more suitable general-purpose computers having appropriate hardware. The programming may be accomplished through the use of one or more program storage devices readable by the processor(s) and encoding one or more programs of instructions executable by the computer for performing the operations described herein. The program storage device may take the form of, e.g., one or more floppy disks; a CD ROM or other optical disk; a read-only memory chip (ROM); and other forms of the kind well known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here. Aspects of the invention may also be configured to perform the described functions (via appropriate hardware/software) solely on site and/or remotely controlled via an extended communication (e.g., wireless, internet, satellite, etc.) network.

While the embodiments are described with reference to various implementations and exploitations, it will be understood that these embodiments are illustrative and that the scope of the inventive subject matter is not limited to them. Many variations, modifications, additions and improvements are possible. For example, one or more databases may be provided to generate one or more outputs to one or more users for selective manipulation of data and/or control of BOP operations at the wellsite.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

Insofar as the description above and the accompanying drawings disclose any additional subject matter that is not within the scope of the claim(s) herein, the inventions are not dedicated to the public and the right to file one or more applications to claim such additional invention is reserved. Although a very narrow claim may be presented herein, it should be recognized the scope of this invention is much broader than presented by the claim(s). Broader claims may be submitted in an application that claims the benefit of priority from this application.

What is claimed is:

1. A method for drilling a wellbore, comprising:
generating a library of defined patterns, each of the defined patterns corresponding to an operational behavior of drilling equipment used to drill the wellbore;
collecting, during operation of the drilling equipment, measurements from sensors coupled to the drilling equipment;
characterizing the measurements as correlating to one of the defined patterns;
detecting the one of the defined patterns in the measurements;
extracting a feature from the measurements;
determining a condition of the drilling equipment by comparing a value of the feature to a threshold derived from the one of the defined patterns; and
activating an actuator coupled to the drilling equipment to adjust operation of the drilling equipment based on the condition.

2. The method of claim 1, wherein the drilling equipment comprises a blow out preventer.

3. The method of claim 1, wherein the one of the defined patterns comprises a sawtooth pattern representative of pressure fluctuations in an idle blow out preventer.

4. The method of claim 3, further comprising determining the condition of the drilling equipment to be abnormal based on a frequency of the sawtooth pattern in the measurements exceeding the threshold, wherein the threshold is based on a frequency of the sawtooth pattern in the one of the defined patterns.

5. The method of claim 1, wherein the feature is a frequency value or a peak amplitude value extracted from the measurements.

6. The method of claim 1, wherein classifying the feature comprises determining a risk value associated with the condition.

7. The method of claim 6, further comprising scheduling maintenance of the drilling equipment based on the risk value indicating that the risk of failure of the drilling equipment is high.

8. The method of claim 1, wherein generating the library comprises collecting measurements from different instances of the drilling equipment over time and deriving the defined patterns from the collected measurements.

9. The method of claim 1, wherein the sensors comprise a pressure transducer or flow meter disposed to detect changes in hydraulic parameters of the drilling equipment.

10. The method of claim 1, further comprising:
confirming the condition by rule-based analysis of the measurements; and
activating the actuator only if the rule-based analysis confirms the condition.

11. The method of claim 1, further comprising replacing a portion of the drilling equipment associated with the measurements based on the condition indicating potential failure of the drilling equipment.

12. A system for drilling a wellbore, comprising:
sensors coupled to drilling equipment and configured to provide measurements of drilling equipment operation used to drill the wellbore;
an actuator to affect operation of the drilling equipment;
a pattern detection system coupled to the sensors and the actuator, the pattern detection system comprising:
a database configured to store a library of defined patterns, each of the defined patterns corresponding to an operational behavior of the drilling equipment;
a pattern detector coupled to the database, the pattern detector comprising:
a pattern characterization unit configured to characterize the measurements as correlating to one of the defined patterns;
a pattern detection unit configured to detect the one of the defined patterns in the measurements; and
a pattern classification unit configured to:
extract a feature from the measurements; and
determine a condition of the drilling equipment by comparing the feature to a threshold derived from the one of the defined patterns;
wherein the pattern detection system is configured to signal the actuator to adjust operation of the drilling equipment based on the condition.

13. The system of claim 12, wherein the drilling equipment comprises a blow-out preventer.

14. The system of claim 12, wherein the one of the defined patterns comprises a sawtooth pattern representative of pressure fluctuations in an idle blow out preventer.

15. The system of claim 14, wherein the pattern classification unit is configured to determine the condition of the drilling equipment to be abnormal based on a frequency of the sawtooth pattern in the measurements exceeding the threshold, wherein the threshold is based on a frequency of the sawtooth pattern in the one of the defined patterns.

16. The system of claim 12, wherein the feature is a frequency value or a peak amplitude value extracted from the measurements.

17. The system of claim 12, wherein the pattern classification unit is configured to determine a risk value associated with the condition.

18. The system of claim 17, wherein a surface unit is configured to schedule maintenance of the drilling equipment based on the risk value indicating that the risk of failure of the drilling equipment exceeds a threshold indicating that the risk is high.

19. The system of claim 12, wherein the pattern detection system is configured to:
derive the defined patterns from measurements provided by different instances of the drilling equipment over time; and
store the defined patterns in the database.

20. The system of claim 12, wherein the sensors comprise a pressure transducer or flow meter disposed to detect changes in hydraulic parameters of the drilling equipment.

21. The system of claim 12, wherein the pattern detection system is configured to:
confirm the condition by rule-based analysis of the measurements; and
activate the actuator only if the rule-based analysis confirms the condition.

22. The system of claim 12, wherein the pattern detection system is configured to schedule replacement of a portion of the drilling equipment associated with the measurements based on the condition indicating potential failure of the drilling equipment.

23. A pattern detection system for monitoring operation of drilling equipment used to drill a wellbore, the system comprising:
a pattern generator configured to:
combine measurements from a plurality of instances of the drilling equipment acquired over time to produce a library of defined patterns, each of the defined patterns corresponding to an operational behavior the drilling equipment; and
store the library of defined patterns in a database;
a pattern detector coupled to the database, the pattern detector comprising:
a pattern characterization unit configured to characterize measurements received from sensors coupled to the drilling equipment as correlating to one of the defined patterns;
a pattern detection unit configured to detect the one of the defined patterns in the measurements; and
a pattern classification unit configured to:
extract a feature from the measurements; and
determine a condition of the drilling equipment by comparing the feature to a threshold derived from the one of the defined patterns; and
schedule replacement of a portion of the drilling equipment associated with the measurements received from the sensors based on the condition indicating potential failure of the drilling equipment.

* * * * *